United States Patent
Landgraf

[11] 3,879,851
[45] Apr. 29, 1975

[54] TURBINE UNIT FOR DENTISTS

[75] Inventor: Hermann Landgraf, Bensheim, Germany

[73] Assignee: Siemens Aktiengesellschaft, Erlangen, Germany

[22] Filed: Dec. 21, 1972

[21] Appl. No.: 317,209

[30] Foreign Application Priority Data
Dec. 27, 1971 Germany............................ 2164789

[52] U.S. Cl........................................ 32/26; 32/27
[51] Int. Cl.............................................. A61c 1/08
[58] Field of Search................................. 32/26-27; 415/503, 112; 184/1 R, 6.26

[56] References Cited
UNITED STATES PATENTS

| | | | |
|---|---|---|---|
| 2,090,885 | 8/1937 | Clark | 32/27 |
| 2,591,129 | 4/1952 | Brouwer | 184/1 R |
| 2,724,858 | 11/1955 | Reichert | 184/1 R X |
| 2,841,244 | 7/1958 | Sorem | 184/1 R |
| 3,052,984 | 9/1962 | Mitthauer et al. | 415/503 |
| 3,069,775 | 12/1962 | Hawtin | 32/DIG. 1 |
| 3,720,290 | 3/1973 | Lansky et al. | 184/6.26 |

Primary Examiner—Louis G. Mancene
Assistant Examiner—J. Q. Lever
Attorney, Agent, or Firm—Richards & Geier

[57] ABSTRACT

A turbine unit for dentists which is operated by compressed air, has a handpiece connected with a supply line supplying the driving means, such as air and water, and means transmitting through a compressed air channel leading to the turbine lubricating means for lubricating the turbine. The invention is particularly characterized in that the means supplying the lubricant are connected to the handpiece or to a connecting part of the supply line located at the side of the handpiece.

7 Claims, 4 Drawing Figures

TURBINE UNIT FOR DENTISTS

This invention relates to a turbine unit for dental work operated by compressed air and having a handpiece receiving through a supply line operating means, such as air and water, as well as means transmitting through a compressed air channel leading to the turbine lubricating means for lubricating the turbine.

A known turbine unit of this type has an oil atomizer to which oil in dosed amounts can be mixed by the flowing compressed air. The oil atomizer is placed in dental supply boxed and is located between the source of compressed air and the supply line transmitting the operating means to the handpiece. Compressed air enriched with oil serves at the same time for driving the turbine rotor and for lubricating the turbine rotor bearing.

This device has the drawback that the supply lines must be made from an oil resisting material or that a special oil must be used for lubrication which does not damage the material of the usual supply lines used for transmitting air or water. Another drawback is that the use of an oil atomizer requires a comparatively high expenditure and, furthermore, it constitutes an additional source of trouble. It was found in actual practice that oil can be deposited in the compressed air channel of the comparatively long usually hanging down supply lines. In that case the amount of oil set at the oil atomizer and indicated as being sufficient for lubricating the turbine rotor bearing, can not be safely assumed to be adequate for such lubrication due to the deposits. Since the deposit at the walls of the compressed air channel does not remain the same in time or in amount and since it can not be controlled an increase of the supplied amount will not avoid this drawback. Rather it is necessary to provide means which will receive the superfluous oil after its passage through the turbine rotor bearing and to remove it. A further drawback is that despite the automatic mixing in of the oil by the oil atomizer a personal supervision of the amount of oil supplied by the air current by the doctor or his assistant can not be avoided. This supervision of the oil atomizer is however difficult since the atomizer is of comparatively large size and can be placed only in a large baffle area (supply box) which usually lies outside of the direct working range of the doctor or his assistant. Thus the supervision of the lubrication of the turbine rotor bearing is complicated and inconvenient.

An object of the present invention is to provide a dental turbine unit of the described type which will not have the above mentioned drawbacks.

Other objects consist in the provision of a turbine unit the costs of lubrication of the turbine rotor bearing of which are considerably lower than those of known devices and which can be more easily supervised. According to the present invention the lubrication of the turbine rotor bearing is simple and safe. It is not necessary to mount and dismount parts of the turbine unit for lubrication of its parts.

Other objects of the present invention will become apparent in the course of the following specification.

In the accomplishment of the objectives of the present invention it was found desirable to connect the means supplying the lubricant to the handpiece or to a connecting part of the supply line located at the side of the handpiece.

This construction of the present invention not only provides a simple, cheap and operationally safe lubrication of the turbine rotor, but also has the advantage that conduit parts coming in contact with the lubricant are very short and actually limited to the range of the handpiece. All parts of the turbine unit leading from the connection of the supply line at the side of the handpiece to the device are neutral, namely, they are not bound to any specific type of turbine drive with possibly varying operational prescriptions. Thus the present invention has the advantage that the same supply line can be connected to turbines with ball bearings or with air support. Even air supported turbines which due to the properties of their bearings should not be lubricated (bearing with carbon sliding bush) can be connected to the same supply line without any great expenditure of time and costs, although heretofore a turbine with oil lubrication was connected to it.

In prior art turbine units an exchange of a ball bearing turbine with oil lubrication for a service-free air supported turbine was possible only with substantial expenditure of time and money, since for this purpose it was necessary to exchange not only the oil atomizer but also the oil supply line and armatures located between the oil atomizer and the handpiece. Otherwise there was the danger that oil would reach the bearings of the turbine from parts of lines or armatures, while this must be positively avoided in case of an air supported turbine which is not serviced. Such a change of a turbine unit from an oil lubricated turbine with ball bearings to an air supported turbine which is not serviced takes place not only in a single general change of the entire unit, but is also possible in daily practice, since each of the two turbine types has its own specific use range.

Thus an important advantage of the present invention consists in that uniform turbine supplying bases useable for all turbine drive types can be provided and that the manufacture and servicing of turbine units can be greatly simplified and made cheaper.

According to a further embodiment of the present invention the handpiece of the connecting part of the supply conduit directed to the handpiece are provided with a passage to the interior of the compressed air channel which may be closed by a closing device.

It is not necessary to take apart the turbine unit or the handpiece for the lubrication. It is advantageous to provide the closing device with a closure which opens for operation.

According to yet another advantageous embodiment of the present invention the closure of the closing device is so constructed that in its basic position it closes the opening leading to outside air and that it opens this opening when the lubricant is supplied. When a lubricant containing bottle is used with corresponding small outflow tubes the closing of the closure device can be operated by the small outflow tubes when they become accessible. This provides an easy supply of the lubricant and furthermore it prevents the escape of compressed air as well as that of the lubricant when the turbine is running. According to an advantageous embodiment of the present invention the closure device is so constructed that when the opening to outside air is open, the opening to the compressed air channel is closed. This makes certain that particularly when a spray nozzle or spray bottle are used, the lubricant will not penetrate inadvertently into the rear part of the compressed air channel.

According to a preferred embodiment of the present invention which particularly effectively prevents the penetration of the lubricant into the rear part of the compressed air channel directed to the supply line, a branch line extending into the compressed air channel is provided between the opening to the compressed air channel and the opening to the outside air. When air flows, under-pressure is produced in the opening of the branch line into the compressed air channel, which facilitates the introduction of the lubricant into the compressed air channel. The closure device preferably consists of a valve which is closed when the compressed air channel is under pressure. When there is no pressure in the compressed air channel the valve is open, so that then an oil bottle or a spray nozzle containing a suitable lubricant can be used to introduce the lubricant into the passage. The valve can be provided with a spring which keeps the passage closed even if the compressed air channel has no pressure, while when there is a corresponding pressure of the little tubes of the oil bottle or the spray nozzle the valve opens and frees the passage.

If the passage with the closing device is located in a separate intermediate part inserted between the handgrip and the turbine head of the handpiece and operationally removable from the latter, then if suitable connections are provided, all heretofore used handgrips can be used again without any great change in the turbine driving unit.

The invention will appear more clearly from the following detailed description when taken in connection with the accompanying drawing showing by way of example only, preferred embodiments of the inventive idea.

Figure 1:
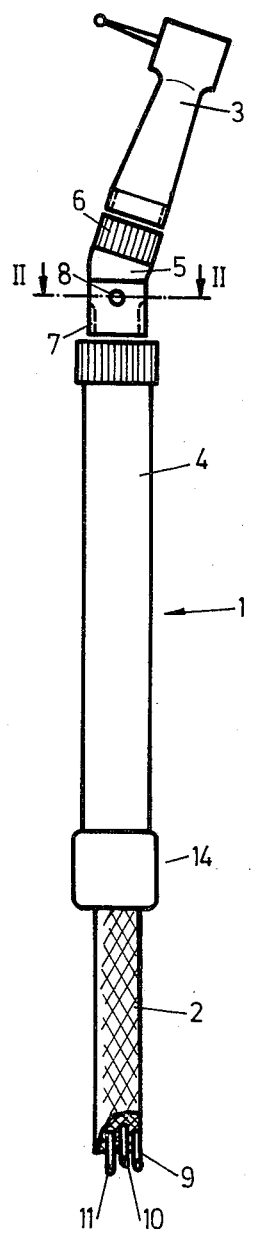
FIG. 1 is a side view of a dental turbine unit of the present invention operated by compressed air.

FIG. 1 shows a dental turbine unit operated by compressed air having a handpiece 1 connected to a supply line 2 leading to the operating means of the turbine. The handpiece 1 consists of a turbine head 3 receiving the turbine rotor, a handgrip 4 and an intermediate piece 5 located between the turbine head 3 and the handgrip 4. The parts 3, 4 and 5 are shown in a dismounted condition in the drawing. The intermediate piece 5 is provided at one end with a lock nut 6 for attachment to the turbine head 3 and at its other end it has a threaded part 7 for connection to the handgrip 4. The intermediate piece 5 has a passage 8 to the interior of a compressed air channel 9 leading to the turbine. Other conduits 10 and 11 located in the supply line 2 are used for supplying water to the turbine head 3, resp. for returning compressed air from the turbine head into the rear end of the supply line 2 located adjacent the handpiece. The connecting part of the supply line 2 located at the side of the handpiece is indicated as 14 in FIG. 1.

Figure 2:
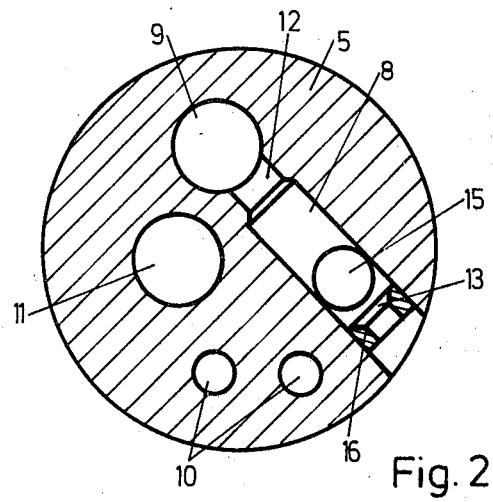
FIG. 2 is a section along the line II—II of FIG. 1. on an enlarged scale.

The section illustrated in FIG. 2 shows that the compressed air channel 9 for supplying compressed air to the turbine is connected by the inlet 8 with the outside air. The opening of the inlet 8 into the compressed air channel 9 is indicated as 12 and the opening into outside air is indicated as 13 in FIG. 2. The conduit 11 serves to return compressed air from the turbine and the conduits 10 are used to supply water to the turbine head for cooling the bored parts. The inlet 8 extends radially to the compressed air channel 9. A ball 15 is freely movable between the openings 12 and 13. When the compressed air channel 9 is under pressure the ball 15 is shifted against the seat 16 of the opening 13, so that the passage 8 to the outside air is closed. When the channel has no pressure the ball 15 releases the opening 13 and at a corresponding position of the handpiece it will drop upon the opposite side of the passage 8 and will close there the opening 12 leading to the compressed air channel 9.

Figure 3:
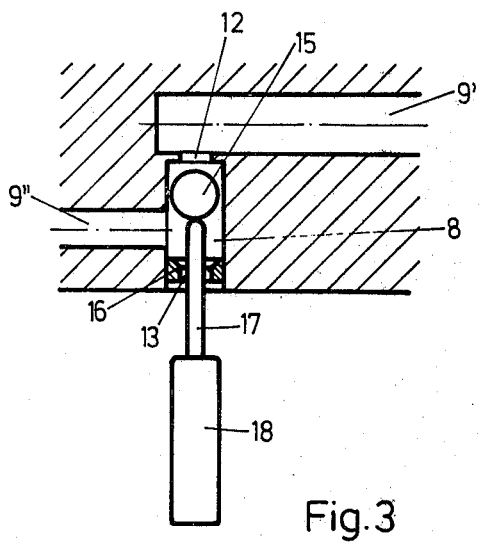
FIG. 3 is a longitudinal section through a part of the handpiece shown in FIG. 2.

The section of FIG. 3 shows that the compressed air channel is divided into two partial channels $9^I$ and $9^{II}$. At their dividing ends the channels $9^I$ and $9^{II}$ are interconnected by the passage 8. A tube 17 of a lubricant container 18 is introduced into the opening 13. It is better to introduce the tube when the conducting channel is without pressure. The ball 15 is then shifted in front of the opening 12 and closes the partial channel $9^I$. When the turbine is driven and thus when the conducting channel $9^I$ is under pressure the ball 15 is pressed against the seat 16 of the opening 13 and thus closes the passage to outside air.

Figure 4:
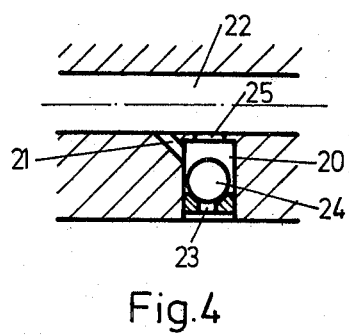
FIG. 4 shows in longitudinal section a different embodiment corresponding to the part shown in FIG. 3.

FIG. 4 illustrates another embodiment of the present invention wherein the passage 20 is provided with a branch 21 opening into the compressed air channel 22. The branch 21 opens tangentially into the compressed air channel 22, looking in the direction of the flow. When the conducting channel 22 is under pressure, the passage 23 is closed by the ball 24. When the conducting channel is without pressure the ball 24 lies at the opening 25 to the compressed air channel 22. In this position a small tube of a lubricant container can be introduced into the passage 23, as shown in FIG. 3. When air flows a light suction is produced at the opening of the branch 21 into the conducting channel 22 with the result that the previously introduced lubricant is mixed with air.

The connections of the intermediate piece 5 are so constructed that they can be screwed into the usual known turbine heads and handgrips. The subsequent lubrication over the inlet (FIG. 1) has the advantage that it is not necessary to remove the turbine head 3 or parts of the rotor casing in order to lubricate the bearings of the rotor.

It should be noted that the passage for the introduction of the lubricant can be also provided in the return air channel if the return air is conducted over the bearings of the turbine rotor. The compressed air channel to the turbine rotor bearings can be branched off from the driving air conduit extending to the rotor blades of the turbine, or it can be constructed as a separate compressed air channel transmitting compressed air to the rotor bearing. As lubricants all generally used lubricants can be employed which can be mixed with compressed air. The lubricants can be supplied from small commercially available oil bottles or from spray nozzles or spray bottles. The latter have the advantage that the lubricant reaches the compressed air channel as very finely divided dust.

It is also possible to place a small flexible lubricant container upon the handpiece. The container should be adapted to the shape of the handpiece and so arranged that it can always remain upon the handpiece. Then when the compressed air channel is under pressure the passage to the container is closed by the closure device, while it is opened when the compressed air channel has no pressure. In order to provide the lubrication the walls of the flexible container will be pressed for a short time.

I claim:

1. A dental pressure air operated turbine unit, comprising a hand piece having a handgrip, a turbine head, means connecting said turbine head with one end of said handgrip, said turbine head having a tool-driving turbine rotor driven by compressed air, a connecting part connected to the other end of said handgrip, a supply line having an end connected to said connecting part, said supply line, said connecting part, said handgrip and said turbine head having interconnected channels for supplying compressed air to said turbine rotor, and means connected with said handgrip for supplying a lubricant to one of said channels for lubricating said turbine rotor, the last-mentioned means having an opening open to outer air and communicating with said one channel and a valve for closing said opening when compressed air is in said channel.

2. A turbine unit in accordance with claim 1, wherein said opening has a side directed to outside air and a side directed to said channels, said valve having a plunger closing the side directed to said channels when opening the side directed to outside air.

3. A turbine unit in accordance with claim 1, wherein said valve is a ball valve.

4. A turbine unit in accordance with claim 1, wherein said handgrip has a branch line communicating with said opening between its two sides and communicating with said channel.

5. A turbine unit in accordance with claim 4, wherein said channels comprise two separate partial channels having adjacent ends, said opening interconnecting said ends.

6. A turbine unit in accordance with claim 1, wherein the first-mentioned means comprise an intermediate piece, said opening and said closing device being located in said intermediate piece.

7. A turbine unit in accordance with claim 6, wherein said intermediate piece is located between said turbine head and said handpiece.

* * * * *